United States Patent [19]

Ohashi

[11] Patent Number: 5,045,653

[45] Date of Patent: Sep. 3, 1991

[54] DISTRIBUTION FOR INTERNAL COMBUSTION ENGINE

[75] Inventor: Yutaka Ohashi, Hyogo, Japan

[73] Assignee: Mitsubishi Denki K. K., Tokyo, Japan

[21] Appl. No.: 522,936

[22] Filed: May 14, 1990

[30] Foreign Application Priority Data

| May 15, 1989 | [JP] | Japan | 1-118760 |
| May 29, 1989 | [JP] | Japan | 1-132854 |
| May 30, 1989 | [JP] | Japan | 1-134733 |
| Mar. 1, 1990 | [JP] | Japan | 2-47276 |

[51] Int. Cl.$^5$ .................. H01H 19/00; F02P 7/02
[52] U.S. Cl. ................................. 200/19 DR
[58] Field of Search ............ 200/19 R, 19 DC, 19 DR

[56] References Cited

U.S. PATENT DOCUMENTS

| 4,007,342 | 2/1977  | Makino et al. | 200/19 R |
| 4,074,090 | 2/1978  | Hayashi et al. | 200/19 DR |
| 4,186,286 | 1/1980  | Kuo et al. | 200/19 DR |
| 4,575,593 | 3/1986  | Welker et al. | 200/19 DR |
| 4,631,369 | 12/1986 | Ohashi | 200/19 DR X |
| 4,640,996 | 2/1987  | Yoshida et al. | 200/19 DR X |
| 4,833,282 | 5/1989  | Matsumura et al. | 200/19 DR |

FOREIGN PATENT DOCUMENTS 51-38853 10/1976 Japan .

Primary Examiner—J. R. Scott
Attorney, Agent, or Firm—Sughrue, Mion, Zinn, Macpeak & Seas

[57] ABSTRACT

A distributor for an internal combustion engine which exhibits a high suppressing effect of noise radio waves even by measurement in accordance with quasi-peak detection and assures stabilized discharge in a discharge gap. The distributor comprises a rotor electrode provided on a distributor rotor secured to a rotary shaft which is connected to be rotated in a synchronized relationship by rotation of a crankshaft of the engine. A plurality of side electrodes are disposed along a locus of rotation of the distributor rotor electrode with a discharge gap left therebetween. A dielectric layer of aluminum oxide or silicon carbide is formed at a location of one or each of a pair of opposite faces of the distributor rotor electrode adjacent and end opposing to the side electrode. A method of producing such distributor rotor electrode with a dielectric layer is also disclosed.

11 Claims, 3 Drawing Sheets

DISTRIBUTION FOR INTERNAL COMBUSTION ENGINE

BACKGROUND OF THE INVENTION

1. Field of the Invention

This invention relates to a distributor for an internal combustion engine, and more particularly to a distributor for an internal combustion engine which includes means for reducing noise radio waves caused by discharge sparks upon the distributing operation. The invention further relates to a method of producing a rotor electrode of such distributor.

2. Description of the Prior Art

A conventional distributor for an internal combustion engine includes a rotor electrode provided on a distributor rotor secured to a rotary shaft which is rotated in a synchronized relationship by rotation of a crankshaft of an internal combustion engine. A plurality of side electrodes are disposed along a locus of rotation of the distributor electrode with a discharge gap left therebetween. A contact element is resiliently pressed against and contacted with an upper face of the distributor electrode and connected to ignition coils by way of a lead wire.

During rotation of the distributor rotor, each time the distributor electrode approaches a side electrode, a high voltage is applied between the electrodes to cause discharge in the discharge gap defined between the electrodes so that the high voltage is distributed successively to the ignition plugs of cylinders of the engine. In this instance, noise radio waves are produced by a spark discharge which takes place in the discharge gap between the distributor electrode and the side electrodes. Those noise radio waves make radio faults to radio broadcasting, television broadcasting, various radio communication devices and electronic devices and deteriorate the S/N ratio of those devices.

Various means have been proposed for reducing production of such noise radio waves. An exemplary one of such means is disclosed, for example, in Japanese Patent Publication No. 51-38853. The means includes a layer of a high resistance substances formed at a location of a surface of a distributor electrode adjacent side electrodes of a distributor. The presence of such high resistance substance layer is effective to reduce the electric field strength of noise radio waves produced upon discharging between the distributor electrode and a side electrode.

However, the conventional distributor for an internal combustion engine having such a construction as described above still has the following drawbacks. In particular, while the high resistance substance layer on the distributor electrode exhibits a significant effect upon measurement of noise radio waves in accordance with peak detection (SAE Standards) which is one of measurements when classified depending upon a detecting method, it does not exhibit a sufficient effect upon measurement in accordance with quasi-peak detection (CISPR Standards). Consequently, an effect of noise radio waves particularly upon an FM radio is not solved as yet. Besides, the insulator layer on the distributor electrode makes the discharge unstable and increases radio noises.

SUMMARY OF THE INVENTION

It is an object of the present invention to provide a distributor for an internal combustion engine which exhibits a high suppressing effect of noise radio waves even by measurement in accordance with quasi-peak detection and assures stabilized discharge in a discharge gap.

It is another object of the present invention to provide a method of producing a rotor electrode for a distributor of an internal combustion engine which exhibits a high suppressing effect of noise radio waves even by measurement in accordance with quasi-peak detection and assures stabilized discharge in a discharge gap.

In order to attain the objects, according to the present invention, there is provided a distributor for an internal combustion engine, which comprises a rotary shaft connected to be rotated in a synchronized relationship by rotation of a crankshaft of the internal combustion engine, a distributor rotor secured to the rotary shaft, a rotor electrode provided on the distributor rotor, a plurality of side electrodes disposed along a locus of rotation of the rotor electrode with a discharge gap left therebetween, and a dielectric layer formed at a location of a face of the rotor electrode adjacent an end opposing to the side electrodes. The dielectric layer may be made either of aluminum oxide or of silicon carbide. Further, a pair of such dielectric layers are formed on the opposite faces of the rotor electrode.

With the distributor, production of noise radio waves involved in discharging is suppressed by the dielectric layer of aluminum oxide or silicon carbide. Such noise radio wave suppressing effect can be confirmed by either one of measuring methods of peak detection and quasi-peak detection.

Preferably, the rotor electrode is tapered such that the thickness thereof is reduced toward the end thereof, and is corrugated or notched at the end thereof. Such tapered construction is effective to stabilize discharging between the distributor rotor electrode and side electrodes.

According to another aspect of the present invention, there is provided a distributor for an internal combustion engine, which comprises a rotary shaft connected to be rotated in a synchronized relationship by rotation of a crankshaft of the internal combustion engine, a distributor rotor secured to the rotary shaft, a rotor electrode provided on the distributor rotor, and a plurality of side electrodes disposed along a locus of rotation of the rotor electrode with a discharge gap left therebetween, the rotor electrode having a dielectric layer formed at a location of a face thereof adjacent an end opposing to the side electrodes in such a manner as to exposed the end of the rotor electrode, the rotor electrode being tapered such that the thickness thereof is reduced toward the end thereof, the rotor electrode being corrugated or notched at the end thereof. The dielectric layer may be made either of aluminum oxide or of silicon carbide. Further, a pair of such dielectric layers may be formed on the opposite faces of the rotor electrode.

With the distributor, since the distributor rotor electrode is tapered such that the thickness thereof is reduced toward the end thereof and is corrugated or notched at the end thereof while the dielectric layer is formed in such a manner as to expose the end of the distributor rotor electrode, discharging is stabilized and production of noise radio waves involved in discharging is suppressed. Such noise radio wave suppressing effect can be confirmed by either one of measuring methods of peak detection and quasi-peak detection.

Preferably, the rotor electrode has a silicon varnish layer formed thereon in such a manner as to cover over the exposed end of the rotor electrode. The silicon varnish layer is effective to suppress production of noise radio waves involved in discharging from starting of the distributor.

According to a further aspect of the present invention, there is provided a method of producing a rotor electrode of a distributor for an internal combustion engine wherein the rotor electrode is provided on a distributor rotor secured to a rotary shaft of the distributor which is connected to be rotated in a synchronized relationship by rotation of a crankshaft of the internal combustion engine, and a plurality of side electrodes are disposed along a locus of rotation of the rotor electrode with a discharge gap left therebetween, which method comprises the step of forming a dielectric layer at a location of a face of the rotor electrode adjacent an end opposing to the side electrodes either by flame coating or by physical vapor deposition. The dielectric layer may be made either of aluminum oxide or of silicon carbide. Further, a pair of such dielectric layers may be formed on the opposite faces of the distributor rotor electrode either by flame coating or by physical vapor deposition.

With the method, a dielectric layer of aluminium oxide or silicon carbide is formed rigidly on a rotor electrode of a distributor by flame coating or physical vapor deposition. Accordingly, a distributor rotor electrode with such dielectric layer can be produced readily in a mass. Besides, a distributor which includes a distributor rotor electrode produced in accordance with the method of the present invention is advantageous in that production of noise radio waves involved in discharging is suppressed and stabilization of discharging is achieved. Such a noise radio wave suppressing effect can be confirmed by either a peak detection or a quasi-peak detection measuring method.

The above and other objects, features and advantages of the present invention will become apparent from the following description and the appended claims. taken in conjunction with the accompanying drawings. in which like parts are denoted by like reference characters all through the drawings.

DESCRIPTION OF THE PREFERRED EMBODIMENTS

Since it is condsidered desirable to describe construction of the prior art before preferred embodiments of the present invention are described in order to facilitate understanding of the invention, the prior art is first described with reference to the drawings.

Figure 8:
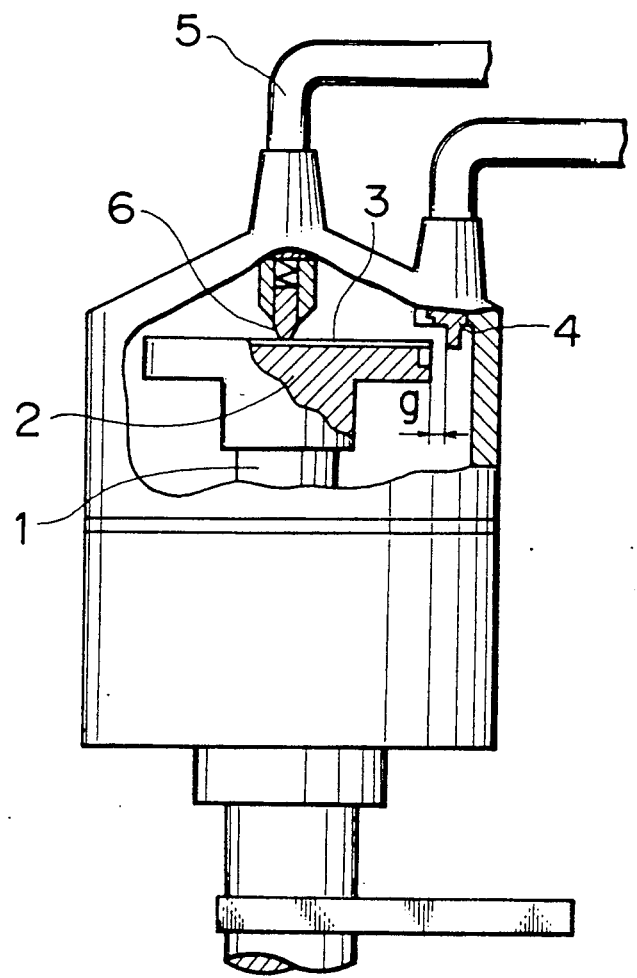
FIG. 8 is a side elevational view, partly in section, of a conventional distributor for an internal combustion engine.

An exemplary one of conventional distributors for an internal combustion engine is shown in FIG. 8. Referring to FIG. 8, the distributor shown includes a distributor electrode 3 provided on a distributor rotor 2 secured to a rotary shaft 1 which is rotated in a synchronized relationship by rotation of a crankshaft not shown if an internal combustion engine not shown. A plurality of side electrodes 4 (only one is shown) are disposed along a locus of rotation of the distributor electrode 3 with a discharge gap g left therebetween. A contact element 6 is resiliently pressed against and contacted with an upper face of the distributor electrode 3 and connected to ignition coils not shown by way of a lead wire 5.

During rotation of the distributor rotor 2. each time the distributor electrode 3 approaches a side electrode 4, a high voltage is applied between the electrodes 3 and 4 to cause discharge in the discharge gap g defined between the electrodes 3 and 4 so that the high voltage is distributed successively to the ignition plugs of cylinders of the engine. In this instance, noise radio waves are produced by a spark discharge which takes place in the discharge gap g between the distributor electrode 3 and the side electrodes 4. Those noise radio waves make radio faults to radio broadcasting, television broadcasting, various radio communication devices and electronic devices and deteriorate the S/N ratio of those devices as described hereinabove.

Figure 9:
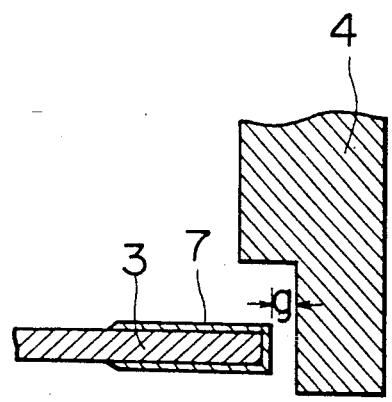
FIG. 9 is an enlarged sectional view of part of the distributor shown in FIG. 8.

Referring now to FIG. 9, a layer 7 of a high resistance substance is formed at a location of the distributor electrode 3 adjacent the side electrodes 4 of the distributor in order to reduce the electric field strength of noise radio waves produced upon discharging between the distributor electrode 3 and a side electrode 4 as described above.

Figure 1:
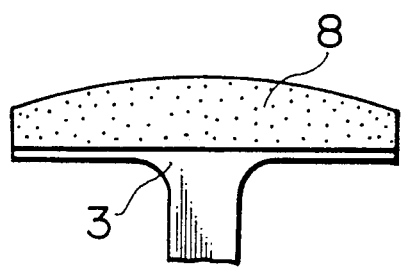
FIG. 1 is a plan view of part of a rotor electrode of a distributor for an internal combustion engine showing a preferred embodiment of the present invention.
Figure 2:
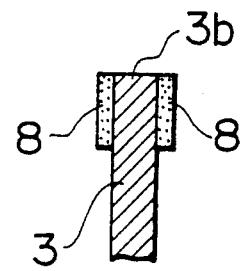
FIG. 2 is a cross sectional view of the distributor rotor electrode shown in FIG. 1.

Referring now to FIGS. 1 and 2, there is shown part of a distributor electrode of a distributor for an internal combustion engine to which the present invention is applied. The distributor electrode denoted at 3 has a pair of dielectric layers 8 of aluminum oxide ($Al_2O_3$) formed on upper and lower faces thereof adjacent side electrodes not shown of the distributor either by flame coating or by laser PVD (physical vapor deposition). The distributor electrode 3 is thus exposed at an outer circumferential face, that is, a radially outer end 3b thereof as particularly seen in FIG. 2 such that it may be opposed directly to the side electrodes.

Figure 3:
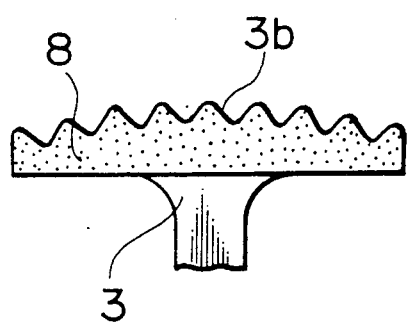
FIG. 3 is a plan view of part of a rotor electrode of a distributor for an internal combustion engine showing a second embodiment of the present invention.
Figure 4:
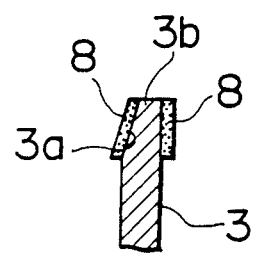
FIG. 4 is a cross sectional view of the distributor rotor electrode shown in FIG. 3.

Referring now to FIGS. 3 and 4, there is shown part of another distributor electrode of a distributor according to the present invention. The distributor electrode also denoted at 3 is tapered at an upper face at a radially outer end portion 3a thereof such that it is reduced in thickness toward a radially outer end 3b thereof as particularly seen in FIG. 4. The radially outer end edge 3b of the distributor electrode 3 is corrugated or notched as particularly seen in FIG. 3. A pair of dielectric layers 8 of $Al_2O_3$ are formed on the tapered face 3a and an opposite rear or lower face of the distributor electrode 3 by flame coating or laser PVD such that the radially outer end 3b of the distributor electrode 3 may be exposed and opposed directly to side electrodes not shown of the distributor. Also the dielectric layers 8 are corrugated or notched at radially outer end portions thereof as seen from FIG. 3. The construction of the distributor electrode 3 so that it is reduced in thickness toward and corrugated or notched at the radially outer end thereof is effective to assure a suitable concentration of an electric field and stabilize discharging between the distributor electrode 3 and the side electrodes.

Distributors having such a construction as described above with reference to FIGS. 1 and 2 and FIGS. 3 and 4 were produced, and investigated. The investigation proved that the dielectric layers 8 formed rigidly on the upper and lower faces of the distributor rotor electrodes 3 suppress production of noise radio waves and have a significant noise radio wave suppressing effect in both of measurement of noise radio waves in accordance with peak detection (SAE Standards) and measurement of noise radio waves in accordance with quasi-peak detection (CISPR Standards).

Also in measurements of a noise electric field strength and acoustic sense judgements for various frequencies, the effect was confirmed from data obtained.

It is to be noted that, while the dielectric layers 8 are formed on the upper and lower faces of the distributor rotor electrode 3 in either of the embodiments described above, only one such dielectric layer may otherwise be provided on either one of the upper and lower faces of the distributor rotor electrode 3. Further, while the dielectric layers 8 are made of $Al_2O_3$, they may alternatively made of silicon carbide (SiC). Similar effects can be achieved with the dielectric layers 8 made of SiC. Or else, they may be made of mica which is known as a substance which presents a comparatively little wear with respect to discharge.

Figure 5:
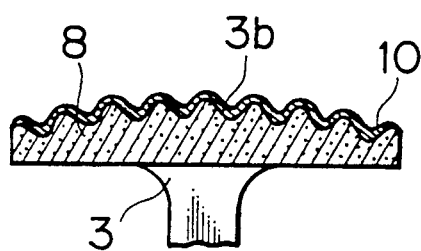
FIG. 5 is a plan view of part of a rotor electrode of a distributor for an internal combustion engine showing a third preferred embodiment of the present invention.
Figure 6:
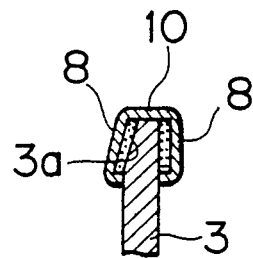
FIG. 6 is a cross sectional view of the distributor rotor electrode shown in FIG. 5.

Referring now to FIGS. 5 and 6, there is shown part of a further rotor electrode of a distributor according to the present invention. The distributor electrode also denoted at 3 is formed as a modification to the distributor electrode 3 shown in FIGS. 3 and 4 and is different from the latter only in that it additionally includes a silicon varnish layer 10. In particular, the silicon varnish layer 10 is formed such that it covers the entire faces of the dielectric layers 8 and the radially outer end 3b of the distributor electrode 3 as particularly seen in FIG. 6. Also the silicon varnish layer 10 has a corrugated or notched construction conforming to the corrugated or notched construction of the radially outer end 3b of the distributor electrode 3 and the dielectric layers 8.

Figure 7:
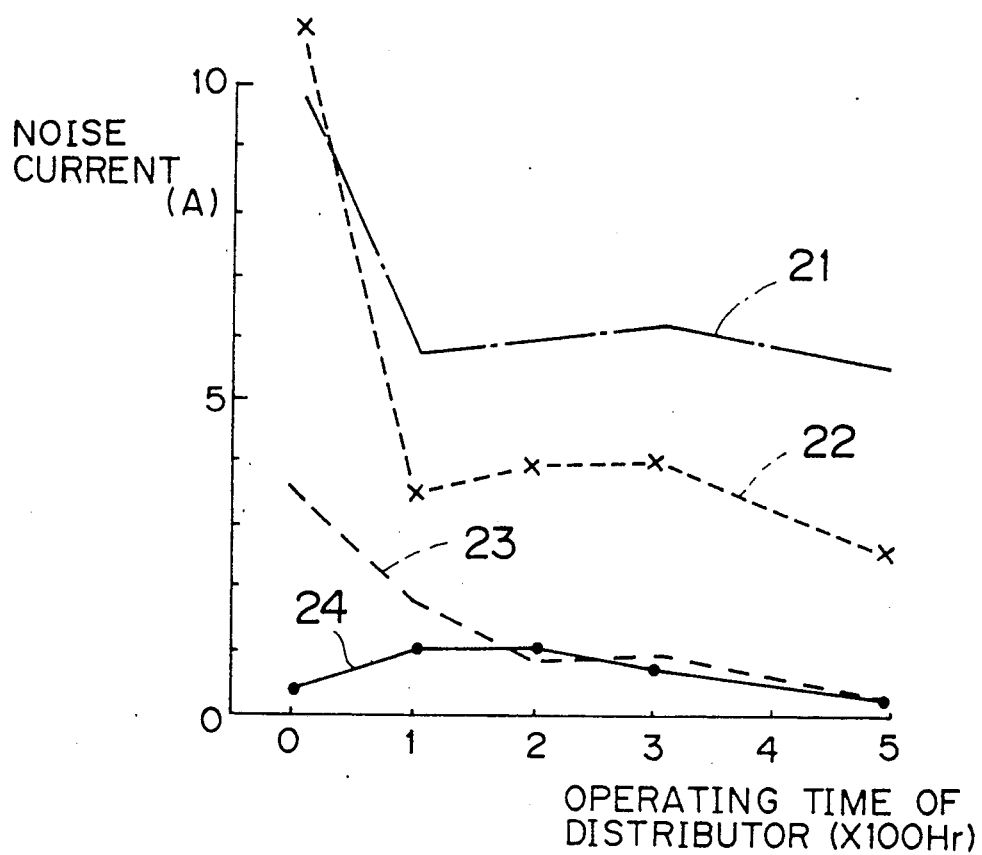
FIG. 7 is a graph illustrating an operating time of a distributor and a noise current.

Generally, the magnitude of a noise electric current and the magnitude of noise radio waves have such a relationship to each other that the smaller the noise electric current, the smaller the amount of noise radio waves produced, and FIG. 7 illustratively shows a relationship between an operating time of a distributor and a noise electric current. Referring to FIG. 7, a curve 21 indicated by an alternate long and short dash line shows such relationship where an SUS electrode is employed as a distributor rotor electrode: another curve 22 indicated by a shorter dash line shows such relationship where a conventional electrode which has a high resistance substance layer provided thereon is employed; a further curve 23 indicated by a longer dash line shows the relationship where the electrode shown in FIGS. 3 and 4 is employed; and a still further curve 24 indicated by a solid line shows the relationship where the modified electrode shown in FIGS. 5 and 6 is employed.

From FIG. 7, it can be seen that, particularly in the case of the distributor rotor electrode shown in FIGS. 5 and 6 wherein the silicon varnish layer 10 is formed at a radially outer end portion of the distributor rotor electrode 3, noise radio waves are produced by a comparatively small amount from an initial stage of operation of the distributor. It is considered that this arises from the fact that the silicon varnish layer 10 is partly exfoliated or removed at an initial stage of operation of the distributor due to oxidation thereof caused by discharging and discharge will thereafter take place in a concentrated manner at the part of the silicon varnish layer 10.

Having now fully described the invention, it will be apparent to one of ordinary skill in the art that many changes and modifications can be made thereto without departing from the spirit and scope of the invention as set forth herein.

What is claimed is:

1. A distributor for an internal combustion engine, comprising:
    a rotary shaft connected so as to be rotated in a synchronized relationship by rotation of a crankshaft of said internal combustion engine.
    a distributor rotor secured to said rotary shaft,
    a rotor electrode on said distributor rotor,
    a plurality of side electrodes disposed along a locus of rotation of said rotor electrode with a discharge gap left therebetween, and
    a dielectric layer formed on a face of said rotor electrode adjacent an end opposing said side electrodes so as to expose said end of said rotor electrode, wherein said rotor electrode is tapered such that a thickness thereof is reduced toward said end thereof and said end of said rotor electrode is one of corrugated and notched.

2. A distributor for an internal combustion engine as claimed in claim 1, wherein said dielectric layer comprises one of aluminum oxide and silicon carbide.

3. A distributor for an internal combustion engine as claimed in claim 1, wherein a pair of such dielectric layers are formed on opposite faces of said rotor electrode.

4. A distributor for an internal combustion engine as claimed in claim 1, wherein said rotor electrode one of corrugated and notched at said one end thereof.

5. A distributor for an internal combustion engine, comprising:
    a rotary shaft connected so as to be rotatable in a synchronized relationship by rotation of a crankshaft of said internal combustion engine,
    a distributor rotor secured to said rotary shaft
    a rotor electrode provided on said distributor rotor, and
    a plurality of side electrodes disposed along a locus of rotation of said rotor electrode with a discharge gap left therebetween, said rotor electrode having a dielectric layer formed on a face thereof adjacent an end opposing said side electrodes so as to expose said end of said rotor electrode, said rotor electrode being tapered such that the thickness thereof is reduced toward said end thereof, said rotor electrode being one of corrugated and notched at said end thereof.

6. A distributor for an internal combustion engine as claimed in claim 5, wherein said dielectric layer comprises one of aluminum oxide and silicon carbide.

7. A distributor for an internal combustion engine as claimed in claim 5, wherein said rotor electrode has a pair of such dielectric layers formed on the opposite faces thereof.

8. A distributor for an internal combustion engine as claimed in claim 5, wherein said rotor electrode has a silicon varnish layer formed thereon so as to cover said exposed end of said rotor electrode.

9. A method of producing a rotor electrode of a distributor for an internal combustion engine, wherein said rotor electrode is provided on a distributor rotor secured to a rotary shaft of said distributor which is connected so as to be rotatable in a synchronized relationship by rotation of a crankshaft of said internal combustion engine, and a plurality of side electrodes are disposed along a locus of rotation of said rotor electrode with a discharge gap left therebetween, said method comprising the steps of:

forming a dielectric layer on a face of said rotor electrode adjacent an end opposing said side electrodes by one of flame coating and physical vapor deposition so as to expose said end of said rotor electrode, forming said end of said rotor electrode so as to be one of corrugated and notched, and providing said rotor electrode with a tapered thickness such that the thickness thereof is reduced toward said end thereof.

10. A method of producing a rotor electrode of a distributor for an internal combustion engine as claimed in claim 9, wherein said dielectric layer comprises one of aluminum oxide and silicon carbide.

11. A method of producing a rotor electrode of a distributor for an internal combustion engine as claimed in claim 9, wherein a pair of such dielectric layers are formed on the opposite faces of said rotor electrode by one of flame coating and physical vapor deposition.

* * * * *